United States Patent
Last

(10) Patent No.: US 7,249,041 B2
(45) Date of Patent: Jul. 24, 2007

(54) SYSTEM AND METHOD FOR POSTING AVAILABLE TIME SLOTS TO A NETWORK HUB

(75) Inventor: Michael E. Last, Alpharetta, GA (US)

(73) Assignee: Last Minute Tee Times, INc., Alpharetta, GA (US)

( * ) Notice: Subject to any disclaimer, the term of this patent is extended or adjusted under 35 U.S.C. 154(b) by 534 days.

(21) Appl. No.: 09/802,367

(22) Filed: Mar. 9, 2001

(65) Prior Publication Data

US 2001/0037225 A1 Nov. 1, 2001

Related U.S. Application Data

(60) Provisional application No. 60/188,321, filed on Mar. 11, 2000, provisional application No. 60/188,110, filed on Mar. 9, 2000.

(51) Int. Cl.
- G06Q 10/00 (2006.01)
- G01C 21/34 (2006.01)
- G01C 21/36 (2006.01)
- G07F 17/30 (2006.01)

(52) U.S. Cl. ............ 705/5; 705/6; 705/27; 705/28
(58) Field of Classification Search ............ 705/5, 705/6, 8, 9, 27, 28
See application file for complete search history.

(56) References Cited

U.S. PATENT DOCUMENTS 5,319,548 A * 6/1994 Germain ............ 700/92

(Continued)

FOREIGN PATENT DOCUMENTS

JP 2001046574 * 2/2001

WO WO 00/63808 * 4/2000

OTHER PUBLICATIONS www.linkstime.com retrieved from Internet Archive Wayback Machine Oct. 6, 1999.*
www.awagolf.com retrieved from Internet Archive WaybackMachine Nov. 27, 1999☐☐.*
www.book4golf.com retrieved rom Internet Archive Wayback Machine Oct. 13, 1999 and Mar. 3, 2000.*

(Continued)

Primary Examiner—Jan Mooneyham
(74) Attorney, Agent, or Firm—Alston & Bird LLP

(57) ABSTRACT

A browser-based tee time posting system for use by golf courses to post available tee times to a tee time reservations hub for reservation by golfers accessing the hub. The system includes a hub web server adapted to serve web pages and to accept time slot information from a golf course user via a browser. Golf course users each with a web browser at respective network nodes request time slot information from the system, receive web pages served by the hub web server in response, and provide time slot information to the hub web server. Golf course users, such as course pro shop employees, may thus autonomously provide updated tee time availability information to the system hub, and the system hub thus need not be burdened with tee time update tasks. The system may generate a simple check box or radio button interface so that the golf course user may easily select and de-select tee times for that course. The system may enable the course user to generate an input template for subsequent use by that course user. In one embodiment, the system may accept tee time inputs from multiple sources, including multiple software-based tee time management systems installed in golf courses. The system reduces the considerable time and expense that golf courses and hubs may incur in posting and maintaining golf course tee time inventory.

7 Claims, 6 Drawing Sheets

U.S. PATENT DOCUMENTS

| | | | |
|---|---|---|---|
| 5,940,803 A | | 8/1999 | Kanemitsu |
| 6,308,160 B1 | | 10/2001 | Rex |
| 6,477,503 B1 | * | 11/2002 | Mankes .......................... 705/5 |
| 7,016,857 B1 | * | 3/2006 | Lloyd et al. .................... 705/5 |
| 7,069,228 B1 | * | 6/2006 | Rose et al. ..................... 705/5 |
| 2001/0027481 A1 | * | 10/2001 | Whyel ........................ 709/218 |
| 2001/0049613 A1 | * | 12/2001 | Gramann et al. .............. 705/5 |
| 2005/0267787 A1 | * | 12/2005 | Rose et al. ..................... 705/5 |

OTHER PUBLICATIONS

ClubCorp Selects Software Product Suite; New Technology Will Support Golf, Tennis and Athletic Operations, PR Newswire, NY 3,1,2000 from ProQuest.*

Greens.com Announces Strategic Alliances and Synergistic Acquisitions to Create One-Stop Worldwide Golf Shop for Tee Time Reservations, Travel Planning, Handicapping Analysis and Online Golf Instruction Business Editors. Business Wire, NY Feb. 10, 2000.* www.linkstime.com retreived from the Internet Archive Wayback Machine of date Oct. 6, 1999.*

Margolis, Philip E., Computer & Internet Dictionary, Third Edition, Random House, 1999.*

Delaration by Michael E. Last submitted Aug. 27, 2004.* www.golfagent.com retreived from the Internet Archive Wayback Machine of dates Dec. 6, 1998, Apr. 28, 1999, and May 10, 1999.*

Declaration of Michael E. Last, Aug. 26, 2004.

* cited by examiner

FIG. 2B

| COURSES | | |
|---|---|---|
| FIELD | DataType | LENGTH |
| Crs_ID | int | 4 |
| Crs_Group | int | 4 |
| Crs_CityID | int | 4 |
| Crs_Name | nvarchar | 100 |
| Crs_Addre | nvarchar | 75 |
| Crs_City | nvarchar | 50 |
| Crs_State | nvarchar | 15 |
| Crs_Zip | nvarchar | 15 |
| Crs_Phone | nvarchar | 50 |
| Crs_Fax | nvarchar | 50 |
| Crs_Email | nvarchar | 200 |
| Crs_Conta | nvarchar | 100 |
| Crs_Holes | nvarchar | 50 |
| Crs_Enable | int | 4 |
| Crs_Comm | ntext | 16 |
| Crs_DateC | datetime | 8 |
| Crs_LastU | datetime | 8 |
| Crs_Desc | text | 16 |
| Crs_Logo | nvarchar | 100 |
| Crs_Image | nvarchar | 100 |
| Crs_Image | nvarchar | 100 |
| Crs_WebN | nvarchar | 300 |
| Crs_GM | nvarchar | 50 |
| Crs_GMEn | nvarchar | 50 |
| Crs_GMIm | nvarchar | 100 |
| Crs_HP | nvarchar | 50 |
| Crs_HPEn | nvarchar | 50 |
| Crs_HPIm | nvarchar | 100 |
| Crs_Dir | nvarchar | 500 |
| Crs_Design | nvarchar | 50 |
| Crs_Webs | nvarchar | 100 |
| Crs_Week | int | 4 |
| Crs_Week | int | 4 |
| Crs_Par | int | 4 |
| Crs_Sounc | varchar | 100 |
| Crs_Graffit | int | 4 |

FIG. 4A

| RESERVATION | | |
|---|---|---|
| FIELD | DataType | LENGTH |
| Res_ID | int | 4 |
| Res_Cours | int | 4 |
| Res_DayID | int | 4 |
| Res_Date | datetime | 8 |
| Res_Slot | int | 4 |
| Res_Book | nvarchar | 50 |
| Res_Book | datetime | 8 |
| Res_Book | int | 4 |
| Res_Book | int | 4 |
| Res_Confi | nvarchar | 50 |
| Res_Party | int | 4 |
| Res_Playe | nvarchar | 250 |
| Res_Holes | int | 4 |
| Res_Paid | int | 4 |
| Res_Amou | money | 8 |
| Res_Status | int | 4 |
| Res_Notes | nvarchar | 250 |
| Res_Canco | datetime | 8 |
| Res_Canco | nvarchar | 250 |
| Res_Hotell | nvarchar | 50 |
| Res_Hotell | nvarchar | 50 |
| Res_Hotell | int | 4 |
| Res_AddIn | nvarchar | 50 |
| Res_AddIn | nvarchar | 50 |
| Res_DateC | datetime | 8 |
| Res_LastU | datetime | 8 |

FIG. 4B

| SLOTS | | |
|---|---|---|
| FIELD | DataType | LENGTH |
| Slot_ID | int | 4 |
| Slot_Cours | int | 4 |
| Slot_DayID | int | 4 |
| Slot_Date | datetime | 8 |
| Slot_Timel | int | 4 |
| Slot_Status | int | 4 |
| Slot_Allow | int | 4 |
| Slot_Reser | nvarchar | 100 |
| Slot_Type | smallint | 2 |
| Slot_DateC | datetime | 8 |
| Slot_LastU | datetime | 8 |

FIG. 4C

| DAYS | | |
|---|---|---|
| FIELD | DataType | LENGTH |
| Day_ID | int | 4 |
| Day_Cours | int | 4 |
| Day_Date | datetime | 8 |
| Day_Nume | int | 4 |
| Day_DateC | datetime | 8 |
| Day_LastU | datetime | 8 |

FIG. 4D

SYSTEM AND METHOD FOR POSTING AVAILABLE TIME SLOTS TO A NETWORK HUB

CLAIM TO BENEFIT OF PROVISIONAL APPLICATIONS

The benefit under Title 35, U.S.C. Sec. 119(e) is hereby claimed of provisional Application No. 60/188,321, filed Mar. 11, 2000 and of provisional Application No. 60/188,110, filed Mar. 9, 2000.

FIELD OF THE INVENTION

This invention relates generally to making information generally available through web-based information hubs by posting information to such hubs, and, more particularly, to browser-based tee time posting systems for use by golf courses to post available tee times to tee time reservations hubs.

BACKGROUND OF THE INVENTION

Computers and the Internet have transformed the golf course management business in many ways. Computers are now routinely deployed in management operations at virtually all golf courses in the United States for course management and for back office functions like accounting and inventory control. Computerized tee sheet management systems first appeared in the 1970s and enabled golf courses to automate their core tee time booking functions, though some courses still employ paper-and-pencil "tee sheets." Unfortunately, deploying customized computerized systems has created as many problems for some courses as it has solved.

With the commercial development of the Internet, web-based tee sheet management systems have been introduced and have been adopted by many courses. The advantage of many web-based tee sheet management systems is that they require only that a standard web browser be installed at the course (in contrast to the custom software installation required to deploy first-generation on-site systems). Any golf course with dial-up access to the web is able to manage its tee sheet online and to offer tee times to the golfing public online.

Many courses have been disappointed by the lack of golfer adoption of their online tee time systems. These single-course web-based systems suffer from a lack of the extensive marketing and brand-building that is required to drive golfing customers to their online tee time solutions. "Build it and they will come" has proven to be an empty promise for many courses.

Online tee time "hubs" such as the LMTT hub at www.lmtt.com have emerged to solve the problem of customer traffic generation experienced by standalone golf course tee time web sites. Hubs such as LMTT offer available tee times from multiple courses so that golfers can view, select and reserve tee times from multiple courses at a single destination web site. Courses benefit because the customer traffic to hubs such as LMTT is far greater than the traffic that they can attract to their own standalone sites.

Hubs such as LMTT add particular value to courses and golfers offering and seeking (respectively) "last minute" tee times. Like airline seats, unfilled tee times represent almost 100% marginal revenue loss to courses. And golfers are often frustrated when they attempt to make last-minute or next-day tee times after the golf course pro shop has closed for the evening. The hub business model thus offers considerable value to courses and golfers alike.

In order to take advantage of the benefits of hubs like LMTT, however, courses must be able to update their next-day and last-minute tee time offerings to the hub very frequently (at least once per day). Unfortunately, known hub systems require frequent phone calls and/or exchanges of faxes at the end of each golfing day in order to keep the hub's offering of the course's next-day tee time inventory fresh. Known approaches to hub updating also impose a considerable burden on the hub itself, which must deal with tens or even hundreds of courses each day.

In summary, conventional systems and methods for updating tee time reservations hubs by multiple courses impose considerable time and expense burdens on the courses and the hubs.

SUMMARY OF THE INVENTION

According to one aspect of the present invention, a system for posting available time slot information to a network hub from a plurality of network nodes is provided. The time slot posting system includes a hub web server adapted to serve web pages and to accept time slot information. The time slot posting system also includes a web browser at several network nodes, where each web browser is adapted to accept time slot information inputted by a network node user, to receive web pages served by the hub web server, and to provide time slot information to the hub web server. According to this aspect of the invention, each network node is associated with a web address by which the respective web browser can access the hub web server.

The time slot posting system may also include a time slot posting page associated with each of the respective network nodes and served by the hub web server, with each time slot posting page including a list of time slots available at the respective network node. According to another aspect of the invention, the time slot posting system may also include a time slot template, with the hub web server being further adapted to enable a network node user associated with a network node to create the time slot template using the respective web browser.

According to another aspect of the invention, each time slot posting page may further include a user selection means associated with each element in the list of time slots available at the respective network node, with the user selection means adapted to enable the respective network node user to select from among the respective list of time slots available and to communicate selection data to the hub web server. The user selection means may be, for example, a web form check box or a web form radio button.

According to yet another aspect of the invention, a system for posting available golf tee times from a golf course to a reservations hub is also provided so that prospective golfers may access an updated list of available tee times and make tee time reservations through the reservations hub. The tee time posting system according to this embodiment includes a tee time reservations hub. The tee time reservations hub includes a web server adapted to serve course input web pages comprising tee time availability information to respective golf course web browsers, and a database comprising tee time information associated with golf courses. The tee time posting system according to this embodiment further includes a plurality of golf course web browsers adapted to browse the course input web page associated with the respective golf course and to provide tee time availability inputs to the tee time reservations hub through the golf course web browser. According to another embodiment, the tee time reservations hub is adapted to accept tee time information from golf course management systems or single-course web-based tee time reservations systems.

The web server may also be adapted to serve golfer web pages containing multiple-course tee time information to prospective golfers so that the golfers may select and reserve tee times from a list of tee times available at golf courses. Each of the course input web pages may include a list of future tee times at the respective golf course, and an input interface to enable a golf course user to select from the list of future tee times which of the future tee times are to be available to prospective golfers for reservation through the tee time reservations hub. According to one embodiment, the course input web pages are secured so that access by the golf course web browsers to the course input web pages may be controlled.

According to another advantageous embodiment, the course input web pages of the tee time posting system also indicate which of the available tee times have previously been posted to the tee time reservations hub. The web server may also include a tee time template, with the web server further adapted to enable a golf course to create the tee time template using the respective golf course web browser.

According to another aspect of the present invention, a method for posting available golf tee times by a golf course to a tee time reservations hub is provided so that prospective golfers may access updated tee time availability information. The method includes the steps of receiving a web page request from a golf course web browser, serving a tee time posting page with a list of future tee times at the respective golf course and a tee time input interface, and receiving a posting input indicating which elements in the list of future tee times are to be available to the tee time reservations hub.

The method may also include the steps of serving a tee sheet template page having a tee time form and a template input interface, and receiving, from the template input interface via the golf course web browser, a completed tee time form associated with the structure of a tee time management system used by the golf course.

According to yet another aspect of the invention, the method may also include the steps of assigning a web page address to the golf course and serving a list of next-day tee times at the respective golf course. The method may also include the step of determining which elements in the list of future tee times have previously been posted to the reservations hub.

The apparatus and methods of the present invention enable golf courses to efficiently post their next-day and advance tee times to a tee time reservations hub like LMTT. The web-based posting process requires almost no operator training and avoids the frequent phone calls and/or faxes required to update tee time hubs using conventional last-minute tee time posting systems. According to one aspect of the invention, the web server also serves golfer web pages containing multiple-course tee time information to prospective golfers so that the golfers may select and reserve tee times from a list of tee times available at multiple golf courses.

BRIEF DESCRIPTION OF THE DRAWINGS

FIG. 2B is an embodiment of a single user interface listing multiple tee times available for multiple golf courses.

FIGS. 4A-D are data tables illustrating the data structure in a system for posting available golf tee times from a golf course to a reservations hub according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

It is one object of the present invention to improve the efficiency of systems and methods for posting last-minute tee time updates to tee time reservations hubs that offer tee times at multiple golf courses to golfers. For example, in one advantageous embodiment of the present invention, a web-based form is provided to a golf course accessing a hub server through a standard web browser, and the golf course user can select which of many available last-minute tee times available at that course are to be posted to the hub and thereby made available to the hub's golfing users.

Figure 1:
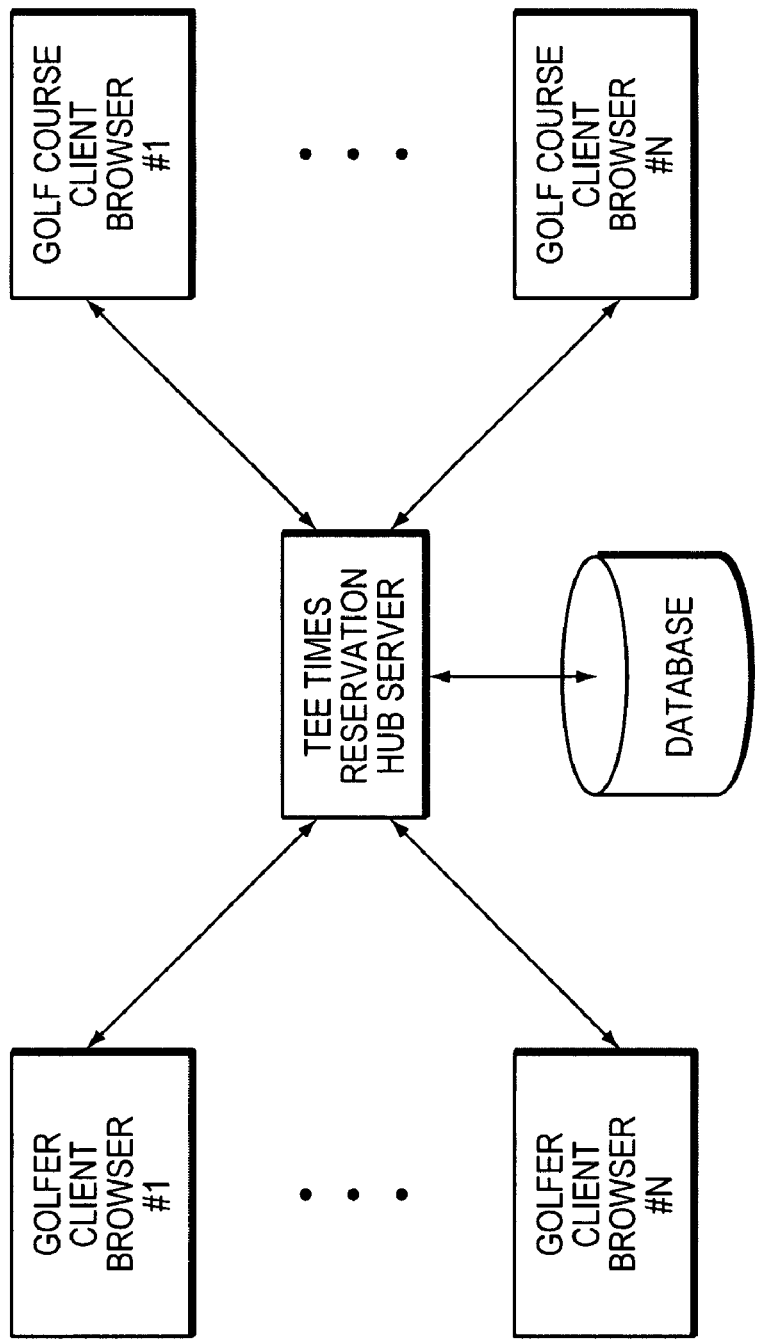
FIG. 1 is a schematic diagram illustrating the elements in a system for posting available golf tee times from a golf course to a reservations hub according to one embodiment of the present invention.

The golf tee times reservation system incorporating aspects of the present invention may be of the form illustrated in FIG. 1, where a central tee times reservation hub server and associated tee times database is shown along with a plurality of golf course client browsers and golfer client browsers.

In one advantageous embodiment, the system for posting available golf tee times from a golf course to a reservations hub according to the present invention may include a time slot posting page such as a Course Configuration Interface ("CCI"). For the purposes of the present detailed description, the CCI implemented by Last Minute Tee Times, Inc. ("LMTT") will be described. The LMTT CCI allows an LMTT client golf course at a network node, such as an Internet address, to post available tee times to the main server database in the tee times posting system for immediate display on the LMTT tee times reservation web site. Courses may also view a real time report showing reservations made through the LMTT tee times reservation interface.

The LMTT CCI is a series of Active Server Pages generated HTML based web pages accessible through a standard Internet browser such as Microsoft Internet Explorer or Netscape Navigator as is known in the art. For the purposes of standardizing and troubleshooting, Microsoft Internet Explorer version 5.0 or greater is the preferable browser.

In one embodiment, an LMTT golf course user, such as a golf course pro shop employee, navigates to a URL of the LMTT server and is presented with a standard login screen that asks for a username and password. Upon entering the username and password, the golf course user is directed to the configuration main menu page for that particular golf course. Multiple users accounts may be provided per course. All courses preferably use the same login URL. From the username, the tee time reservation system preferably determines which course information to present to the golf course user.

Figure 2A:
FIG. 2A is a computer screen shot illustrating a course input web page comprising tee time availability information accessible to a golf course web browser according to one embodiment of the present invention.
Figure 3:
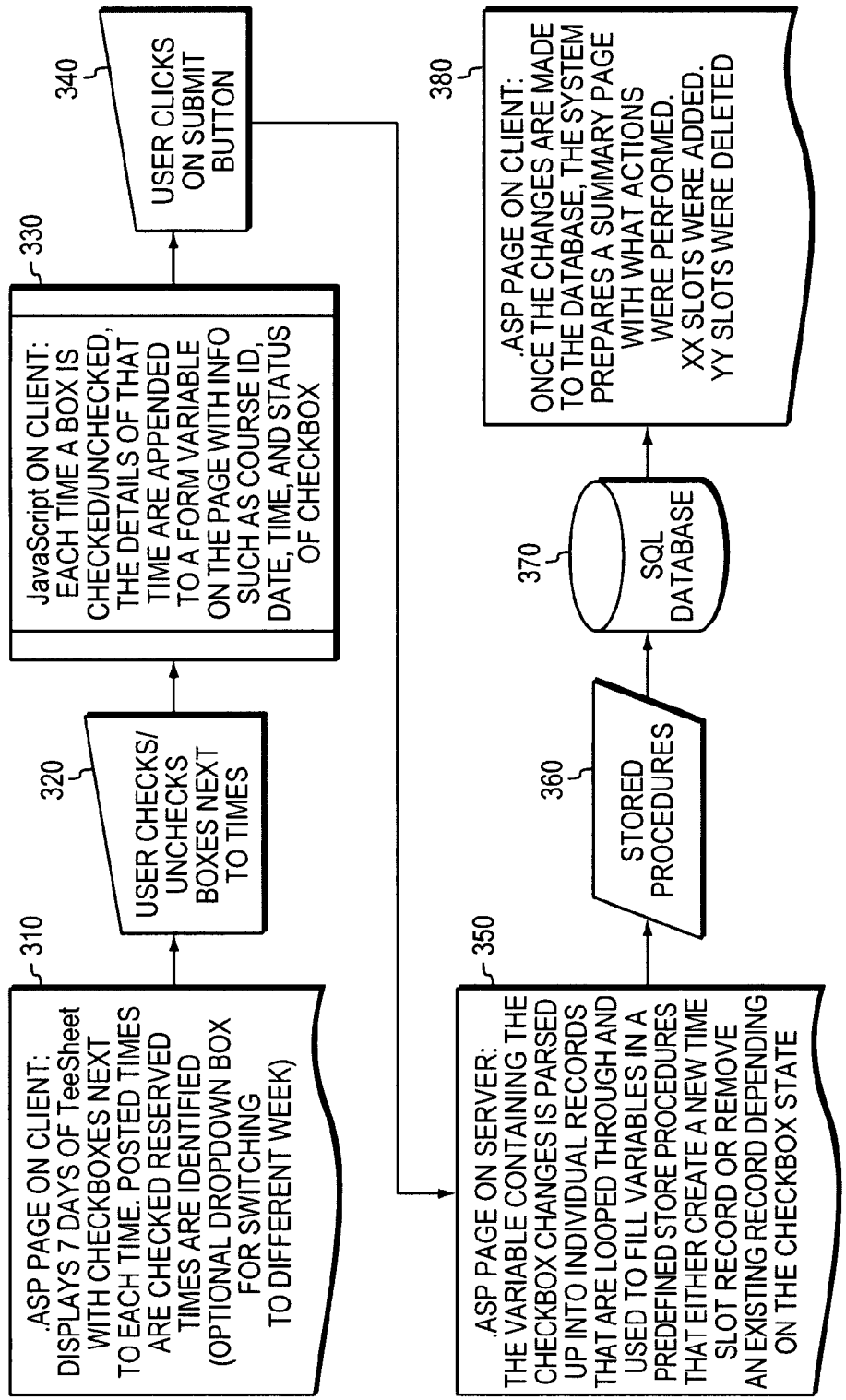
FIG. 3 is a flow diagram presenting the steps in a method for posting available golf tee times by a golf course to a tee time reservations hub according to one embodiment of the present invention.

The main golf course user menu may consist of several menu items that allow the course user to manage certain aspects of the LMTT tee time reservation system, the most important item being the posting of tee times available for golfer reservation. Other menu items provided by the LMTT CCI may include viewing an updated booking report, creating a time slot template, viewing and editing the course note/announcement that is shown to LMTT golfers when they view and reserve tee times, and a simple form that allows a course user to send an email to the LMTT tee time reservation system without having an email client installed on the course user's computer. The tee time template may comprise a tee time form associated with the structure of the tee time management system used by the golf course One important feature of the LMTT CCI according to one embodiment of the invention is that a course user may independently post, view, and/or withdraw tee time slots that are to be available to golfers without requiring any participation by LMTT personnel. FIG. 2 is a screen shot of a Time Posting interface presented to a course user (such as a pro shop employee) according to one embodiment of the invention. FIG. 3 is a flow diagram illustrating the steps in a method for posting available golf tee times by a golf course to a tee time reservations hub according to one embodiment of the present invention. When the course user opens an input interface such as the Time Posting interface illustrated in FIG. 2, they are presented with seven columns of times representing the seven days of the current week as indicated at step 310. Each column displays times that are currently posted on the site, and indicates whether or not any of those times are already reserved. The columns may also display times that match the course's paper or electronic tee sheet. The tee sheet parameters may be determined by using start and end times and intervals that are all established and maintained by the LMTT tee time reservation system. An optional drop-down box allows a course user to switch to different sets of seven-day data columns.

Next to each tee time in the data columns in FIG. 2 is a standard HTML Checkbox, according to one embodiment. If a tee time is already posted on the LMTT site as available for reservation by a golfer accessing the LMTT tee times posting system from a web browser, a check appears in the box; if the time has not been posted to the LMTT system, the checkbox is clear. If a posted time has already been reserved, the checkbox may display a small icon (such as a small red "R") indicating such.

If a golf course user of the system wishes to "pull down" or remove a time that has previously been posted as available for reservation by golfers, the course user simply un-checks the box next to the posted time, as indicated in step 320. To "post" or add a time as being available for reservation by golfers through the LMTT system, the course user checks a box next to the desired time. Boxes may be checked and unchecked as many times as desired while configuring the seven day set of data. Once the course user is satisfied with the updated posting configuration for that seven-day period, the course user simply clicks at step 340 a button marked "Apply Changes Now" or "Submit" to submit the changes to the LMTT tee time reservation system server.

In one embodiment of the invention, the system is adapted to accept inputs and updates from various tee time sources, including from tee time software applications serving a single or multiple golf courses. According to this embodiment, the system may combine databases and importing tee time inventory from multiple sources so that tee times from such multiple sources may be offered for reservation by the system to prospective golfers.

Figure 2B:
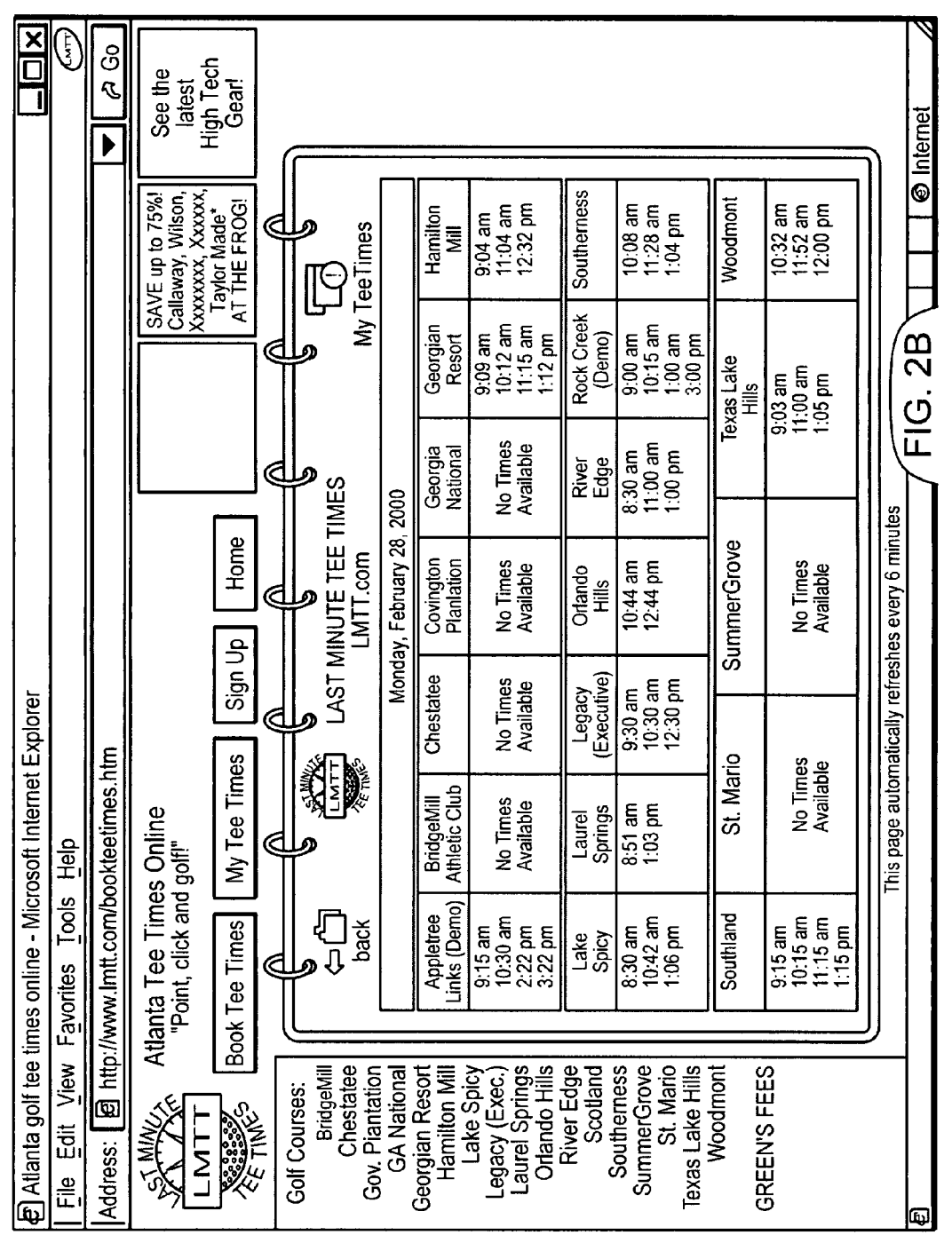

In one advantageous embodiment of the invention, tee time inventory for a plurality of golf courses is displayed on a single user interface, as shown in FIG. 2B. The intent is not to display the entire tee sheet, but instead a subset of the available tee times in a convenient fashion that does not require the golfer to undertake an elaborate database query to "zero in" on a desired tee time. The system instead displays only a few tee times per course per day but displays tee times from several courses on a single screen. In one embodiment of the invention, tee time inventory is gathered from multiple sources, such as the LMTT CCI and from multiple data sources connected to electronic teesheets. One advantage of this approach is that it is much more convenient to a prospective golfer to be able to view a subset of availability from several courses than it is to do an elaborate search. According to this embodiment, the system does not use database search queries (the "shot in the dark" approach) so tat the display for the golfer is simplified, thus improving the utility to the golfer. This embodiment also overcomes golfer frustration resulting from "drill down" website architectures which require a user to navigate through multiple web pages to arrive at a web page for a particular golf course to reserve a tee time.

To reduce database processing overhead and improve response time, it may be advantageous to minimize the number of database calls required to post and pull down times. Therefore, client side JavaScript may be implemented at step 330 on the posting form as an aid to this process, according to one embodiment of the invention. When a course user checks or un-checks a box next to a time, an event is triggered that appends that checkbox information to a form variable on the page. The information includes Course ID, Date, Time, and Status of the checkbox. On any typical posting form there may be hundreds of checkboxes, perhaps 50 to 75 checkboxes/times for each of seven days. In order to minimize processing, then, only the changes are passed to the processing routine.

According to this embodiment, the posting form submits the changes that the course user made to the LMTT tee time reservation system server at step 350, and a routine parses the information into individual array elements that can be looped through. The information from each element is used to populate variables passed to a SQL Stored Procedure at step 360. The Stored Procedures are stored on an SQL Server at step 370 and contain the code that actually modifies the SQL database tables and records in the LMTT tee time reservation system. If a box was checked, a new time slot record is added to the database. If a box was unchecked, that timeslot record is removed from the database. Any timeslots that contain reservations are not removed. Utilizing this method, the process usually only takes a few seconds, and the user is then presented at step 380 with a confirmation screen detailing the actions that were performed, including the number of timeslots that were added and the number that were removed.

As shown in the data tables of FIGS. 4A-D, the LMTT tee time reservation system database structure consists of multiple tables that are linked through common ID numbers. It is based on standard relational database practices as are known in the art. One exception to standard practices is the method that is used to link Time Slot records to Reservation records in the LMTT tee time reservation system. Each Time Slot record includes a text field that can hold a list of multiple Reservation ID numbers. This is necessary because a single Time Slot can hold multiple reservations; during the building of tee sheets, it is impractical to utilize a third linking table with multiple records for each Time Slot/Reservation combination. When a timeslot is displayed on the screen the LMTT tee time reservation system simply checks to see if the Reservation field contains any information. If so, the system identifies that timeslot on the screen as such (generally with an icon of some sort) and includes the Reservation ID numbers in the definition of the Checkbox field. This approach allows a course user to click on a timeslot and view the reservations quickly.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising the steps of:

with a hub server, receiving a request for a web page from a golfer computer via a communications network, the golfer computer located remotely from the hub server;

in response to the request, generating a single web page listing multiple tee times available at a plurality of golf courses for reservation by golfers, the multiple tee times indicated as available for each golf course for a date being a subset of all of the tee times at the golf course for the date; and transmitting the single web page to the golfer computer via the communications network.

2. A method as claimed in claim 1 further comprising the steps of:

receiving specific tee times posted by a plurality of golf course users' computers via the communications network, the golf course users' computers located remotely from the hub server and the golfer computer, storing the available tee times in a database; and in response to the request, retrieving the available tee times from the database for use in the generating the single web page.

3. A method as claimed in claim 1 further comprising the steps of:

receiving a reservation for a selected golf course and tee time from the user computer via the communications network;

storing the reservation in the database; and transmitting the reservation to the computer of the selected golf course via the communications network.

4. A method as claimed in claim 1 wherein the communications network is the Internet.

5. A method as claimed in claim 1 wherein the listing of the multiple available tee times are next-day tee times for respective golf courses.

6. A method as claimed in claim 1 wherein the request designates a specific geographic region and the single web page is generated to list available tee times for only the golf courses in the specific geographic region.

7. A method as claimed in claim 1 wherein the request includes a date on which the golfer desires to play but does not require the golfer to specify the golfer's desired time of play in order to generate a list of available tee times.

* * * * *